United States Patent [19]

Talmi

[11] Patent Number: 4,475,173
[45] Date of Patent: Oct. 2, 1984

[54] MULTIBIT UNIDIRECTIONAL SHIFTER UNIT

[75] Inventor: Maati Talmi, Berlin, Fed. Rep. of Germany

[73] Assignee: Heinrich-Hertz-Institut für Nachrichtentechnik, Berlin, Fed. Rep. of Germany

[21] Appl. No.: 299,281

[22] Filed: Sep. 4, 1981

[30] Foreign Application Priority Data

Sep. 30, 1980 [DE] Fed. Rep. of Germany ....... 3037359

[51] Int. Cl.$^3$ .............................................. G06F 7/00
[52] U.S. Cl. .................................... 364/900; 364/715
[58] Field of Search ................. 364/900, 200, 715, 748

[56] References Cited

U.S. PATENT DOCUMENTS

| | | | |
|---|---|---|---|
| 3,768,077 | 10/1973 | Nier et al. | 364/900 |
| 3,887,799 | 6/1975 | Lindgren | 364/900 |
| 3,916,388 | 10/1975 | Shimp et al. | 364/900 |
| 3,961,750 | 6/1976 | Dao | 364/900 |
| 4,122,534 | 10/1978 | Cesaratto | 364/900 |

OTHER PUBLICATIONS

Frecon, "Cellular Arrays as a Programmable Switch & Fl. Pt./Fixed Pt. Converter", *Electronics Letters*, Dec. 1969, pp. 651–652, vol. 5, No. 25.

Hilberg, "Die Bildung des Logarithmischen Analogwertes einer Ziffern-und Stellenmäbig Vorgegebenen Groben Zahl", *Regelungstechnik*, Helf 2, Jan. 10, 1962, pp. 65–70.

Block et al., "Architecture for VLSI-CKTS in Digital Signal Processing", *Proc. of the IEEE International Conf. on CKTS & Computers*, Oct. 1980, pp. 1184–1187.

*Primary Examiner*—David H. Malzahn
*Attorney, Agent, or Firm*—John C. Smith, Jr.

[57] ABSTRACT

An arithmetic unit, particularly for floating point operations, is provided in which numeric words with n digits, shifted by any desired number of digits, can be taken, in one step with a duration independent of the extent of the shift, from a shift array which is constructed from tri-state elements in a triangular matrix.

8 Claims, 6 Drawing Figures

MULTIBIT UNIDIRECTIONAL SHIFTER UNIT

BACKGROUND OF THE INVENTION

This invention relates to a unit, particularly for floating point operations, having input and output devices which form the transition to data paths, control devices and devices for the simultaneous processing of data words, or parts of a data word, which represent characters and numbers with different arithmetic meanings.

A floating point unit (FPU) for carrying out floating point calculations within a data processing system is known from DE-OS (German Offenlegungsschrift) No. 29 49 375. It has a mantissa device, an exponent/sign device and a control device for controlling the mantissa device and the exponent/sign device. The mantissa device treats the mantissa parts of certain data in a first predetermined manner, the exponent/sign device treats, in a second predetermined manner, other data received by the mantissa device, and the control device allows the simultaneous activity of the mantissa device and the exponent/sign device. Concurrently or simultaneously carrying out mantissa operations and exponent/sign operations naturally results in an increased total efficiency. With the clock frequencies or cycle times used in these operations, a total of approximately 1100 ns are required for the individual states and functions during a floating point operation. The multitude of electronic components from which this known floating point unit is constructed also includes a shift register. This is constructed as a hexadecimal shift device and contains, in three columns and five lines, a total of 15 modules, which, however, are to be seen functionally as a single chain.

A rapid shift network which has a mask generator and cycling facility, and which is also intended for floating point arithmetic, is known from DE-OS (German Offenlegungsschrift) No. 27 45 451. Right-justified or left-justified shifts, which can be achieved by a sequence of single shifts and logic operations, can be more rapidly effected if networks which essentially function as shift registers, with the insertion of the correct number of characters to be filled in (zeros and ones), are used. In the case of the known shift network mentioned here, the basic shift function is broken down into two sub-functions—the rotation or cyclic shift and the production of a mask vector. These measures favorably affect the operational speed, the structure of the network with basic function blocks, and the control of the functions. The cycling unit provided for rotation shifts a basic data word cyclically by a number of digits which is prescribed by a shift-amount control word. The mask generator produces mask vectors, for example an array of zeros, the length of which is also determined by the shift-amount control word and which is followed by a series of ones (right-justified shift). Both processes are carried out in parallel. The number of output lines of the mask generator is equal to that power of two the exponent of which is equal to the number of input address lines. In the production of integrated circuits, the number of connecting pins or contacts is of substantial importance, so that mask generators as integrated circuits (IC) for these reasons can have between three and five input address lines, at the present state of technology.

In addition, 8-bit shift units are commercially available as integrated circuits, for example from the Signetics firm with the designation 8243 (Signetics Data Book, 1974, pages 3–28 to 3–32), it being possible to control the shift units by means of a 3-bit binary selection code. The advantage of shift units of this type in comparison with simple shift registers consists, on the one hand, in a higher speed and, in addition, in a low requirement of external logic elements. No clock pulses are necessary for the approximately 70 gate functions of a shift unit of this type, The speed is therefore only dependent on the circuit speed. These shift units can also be extended, for example by connecting together two modules of the type having 8 bits at the input and 16 bits at the output. For further extensions, however, the connections become very complex. In order to be able to shift in both directions, shift units of this type must be provided for each direction.

So-called "octal inverter buffers" with tri-state outputs are also commercially available as integrated logic circuits (see, for example, Valvo handbook "Signetics Integrated Logic Circuits 1978-79", pages 374/375, type 54/74, Series "240"). They mainly serve to switch signals through, without feedback, from several sources to an information sink, and have for this purpose several tri-state elements, for example four in each case, which can be conjointly activated and the outputs of which indicate the signals H or L (high/low) or a very high resistance.

The invention assumes that, because of the technological possibilities for carrying out frequently required arithmetic operations with appropriately constructed arithmetic circuits, the use in computers of modules or arithmetic units with circuits of this type is becoming increasingly economical. In this context, the speed as well as the number and the variety of the functions required in such circuits are of considerable importance. The frequently required arithmetic operations include, in particular, the shifting of numeric words, for example in floating point operations.

SUMMARY OF THE INVENTION

It is, therefore, the object of the present invention to provide a shifter unit, particularly for floating point operations, in which, independently of the number of digits, all shifts can be carried out with one and the same high speed, and which essentially contains—that is to say, in the shift array and for the input and output units—only one type of logic elements, i.e. tri-state elements.

To attain this object the present invention provides a unit, particularly for floating point operations, having input and output devices which form the transition to data paths, control devices and devices for the simultaneous processing of data words, or parts of a data word, which represent characters and numbers with different arithmetic meanings, which comprises a shift array for n-digit numeric words, which is constructed from tri-state elements and contains in total, in n lines and n columns, a number $n(n+1)/2$ of elements of this type with which, by means of one particular control signal from a total of n control signals, the n inputs of the shift array, which are assigned to the individual digits of the numeric words, can be switched through, shifted by a particular number of positions, to the n outputs of the shift array; a read and output device, constructed from tri-state elements and connected to data paths, for the shift array having at least n such elements for the n-digit numeric words, and a control unit with a decoder, which converts a source record into an n-digit object record, of which the individual characters form the control signals to be fed to the shift array.

For a more exact explanation of the construction and function of the arithmetic unit according to the invention, the shift array is first explained more closely. The object of this shift array, for example, consists in representing a binary numeric word with n digits in such a manner that the most significant bit (MSB-first one of the digit sequence) appears left-justified or right-justified. For the n digits in the numeric word, there are n possibilities for the MSB. These n possibilities are accounted for, independently of the actual position of the MSB, in lines of the array which are each shifted, from line to line, by one digit. This gives a triangular matrix, since, on shifting the lines, the positions which become free at the end of the least significant bit (LSB-last one of the digit sequence) do not have to be occupied, and the positions which are not required at the end of the MSB do not have to be replaced. The numeric word appears at the output in the desired shifted representation when the line of the array which relates to the true position of the MSB is read and thereby the characters to be filled in at the LSB end appear as a sequence of identical digits (zeros/ones). This means that the signal inputs of the array lead for the MSB in the first position only to one tri-state element which is located in the first line and the first column; for the MSB in the second position, to two tri-state elements which are situated in the first line/second column and the second line/first column, etc., until for the MSB in the last position (nth position) they lead to n tri-state elements in the first line/nth column, second line/(n−1)th column, etc., until the nth line/first column. The signal outputs of the tri-state elements of each column are collected together, as are the control signal inputs of all tri-state elements of a particular line. The principle of the construction of such a matrix remains equivalent in its function if, with respect to the signal inputs, signal outputs and control signal inputs, the directions of the chain-like interconnections are interchanged.

It is, of course, also possible with such a shift array to shift an input numeric word by a desired number of digits, also independently of the position of the MSB. The shift of a binary numeric word corresponds, according to the direction of the shift, to a multiplication or a division by powers of two. It can easily be seen from this that such a shift array is advantageous not only for floating point operations.

Since the shift array essential for the invention has no logic elements for the omitted positions, but zeros must appear in the output, it must be ensured that the third, high-impedance state of the tri-state elements yields such zeros. For this purpose, the output unit which is constructed from tri-state elements and has a control signal $\overline{OC}$ is used for accepting the numeric word. An appropriately constructed device is also used for decoupling, too.

The control device, with which it is established, and by logic decisions fixed, at which numerical value of the numeric word located at the input of the array which line of the array is to be read, is also of substantial importance for the invention. In this context, it is intended, firstly, to make a short examination of the basics of floating point and fixed point calculations.

In the fixed point representation, a number is indicated by a single numeric word, in which each digit, with respect to its position as well as through its value, makes its contribution. If the base point is located, for example, at the end of the LSB, that is to say, the numeric character with the least significance, the significances of all positions are greater than or equal to one, and the numeric word represents an integer. In contrast, if the base point is located at the end of the MSB, that is to say, the numeric character with the highest significance, the numeric word represents a number which is smaller than one, and is thus a real fraction.

In the floating point representation, a data word, which contains two numeric words, is used for the numerical representation, in particular, for the number x to be represented, the mantissa M of which and the exponent E of which correspond to the formula:

$$x = \pm M \cdot b^{\pm E},$$

wherein the number b, the floating point base, is a positive integer and need not be explicitly represented, if—as is customary—its value on the basis of the agreed convention is always the same. In these cases, the number x can be an integer or non-integral, positive or negative. Defined digits in the data word, mostly before the relevant numeric word, are therefore provided, if desired, for the signs of the exponent and also of the mantissa. The effort for the individual arithmetic operations (addition, subtraction, multiplication and division) is variable. In fixed point representation, many operations, for example with short numeric words, are more easily realizable. For example, for the addition of two numbers in floating point representation, both addends must have the same exponent E. The number of digits by which a mantissa is to be shifted follows from a comparison of the exponents. The result has to be normalized, if appropriate, that is to say, the mantissa has to be shifted so that the MSB is located in the first position, and the exponent must be correspondingly corrected. This type of shift of a mantissa is thus necessary before the actual arithmetic operation, and in the case of normalization or in the case of overflow of the result. Most of the execution time is spent in comparison of the exponents, in generating logic decisions and in shifting.

In the embodiments of the invention, the control device is responsible for the evaluation of the exponents and the generation of logic decisions, and enables these steps to be carried out in a very short throughput time. In this connection, the decoder is of considerable importance, the output signals of the decoder representing the control signals to be fed to the shift unit. It has, for example in the case of 4-bit numeric words, only to give at the allotted output, from the $2^4 = 16$ possibilities for exponents of the base 2, the position corresponding to the value of the exponent. These outputs of the decoder are each firmly associated, with respect to the control signals, with one line of the shift array. It is therefore ensured that always only the one relevant line is selected and can be read.

Shift processes of this type are necessary not only in calculations in floating point representation. As already mentioned above, multiplications/divisions can be carried out in this manner in fixed point representation, with powers of two. In addition, fixed point/floating point transformations or conversions are of particular importance, since data to be processed is often present in fixed point representation. For example, floating point/fixed point transformations are to be carried out by means of shift operations if data (after an arithmetic operation in floating point representation) is to be output via a digital/analog converter.

In a preferred embodiment of the invention the input and output units are equipped with additional tri-state elements which are assigned to a position representing a sign (plus/minus) in the data word. This is the sign of a numeric word in fixed point representation or a numeric word for the mantissa in floating point representation, which does not change in shift operations and can therefore be taken outside the lines and columns of the shift array.

An embodiment of the invention in which the input and output units each consist of two records of n tri-state elements each and accept an n-digit numeric word in mirror-image representations to each other in each case, is particularly preferred. This implies that a numeric word with, for example, a left-justified MSB is accepted by the input unit in this representation as well as mirrored, that is to say, with a right-justified MSB. If, owing to the arrangement of the tri-state elements in the triangular matrix, the shift array for example only carries out left shifts, but is fed with the numeric word to be shifted having a right-justified MSB instead of a left-justified MSB, the left shift of the mirrored numeric word and a repeated mirroring, now of the shifted numeric word in the output unit, is equivalent to a right shift. For shifts in both directions, only a single configuration, further still only a single shift array, is necessary with input and output devices of this type. The direction of the shift is without any significance with respect to the sign of a numeric word to be shifted to the left or to the right. Only a single set of tri-state elements for sign data is thus required in the input or output unit. However, a small difference in comparison with a non-mirroring output unit with respect to the sign signal consists in the fact that two tri-state elements are to be provided for reading out the sign, which elements are connected in parallel with respect to the signals, and the inputs of which lead to the signal output of the sign tri-state element of the input device, but with respect to the control signals are separately connected for "left shifts" or "right shifts" with the appropriate tri-state elements for the characters of the numeric words.

With respect to the construction of parts of the embodiments according to the invention as integrated circuits, it is very expedient if the tri-state elements for the shift array and for the input and output units are contained there in one module. For 8-bit data words such a module would require a total of 24 pins, or connecting lugs, for the signal inputs and signal outputs and for the control signals, so that—including the lugs for the power supply—commercial sizes result in this case.

If data words which are longer than 8-bits are to be processed, the number of control signal inputs can be reduced on including in the integrated circuit the decoder assigned to the control device, according to a further preferred embodiment of the invention. Without going more deeply here into the technological questions concerning the integratability, it may only be further mentioned that a further increase is possible with an alternating use of the connecting lugs for the input and the output signals. On the other hand, the fact that in embodiments of the invention—in contrast, for example, to multiplexers, which are used for such purposes in the hitherto known state of the art—the outlay for higher precision of arithmetic operations, that is to say for greater word lengths of the numeric words to be processed, does not increase disproportionately, and the word length has no effect at all with respect to the processing time.

The universal applicability of the embodiments of the invention allows or requires special forms of the control devices for specific arithmetic operations. For this purpose, among the multitude of uses of shift operations, in particular the possibilities of transformation of fixed point representation into floating point representation and vice versa are of considerable importance for the invention. For the fixed point/floating point conversion, the control device can preferably have a PAL (programmable array logic) module, the outputs of which yield a source record for the decoder and a result for a numeric word representing an exponent. It is therefore possible, during a single step, on the one hand to establish the position of the MSB in a numeric word in fixed point representation from which the associated number of positions by which the numeric word is to be shifted follows, and to give the value of the exponent numeric word for the floating point representation, as well as—during the same step—to carry out the shift of the numeric word, that is to say, to remove from the shift array the numeric word shifted by the appropriate number of positions.

A floating point/fixed point conversion can be carried out in a similar manner, and just as surprisingly simply, if the control device has an inverter for a numeric word which represents a source record for the decoder. In this process, likewise during a single step, the part of the data word corresponding to the exponent is fed, on the one hand, from the data word which is to be converted and which is present in floating point representation, to the inverter which inverts the characters of the exponent numeric word as a source record for the decoder, whilst on the other hand the part of the data word corresponding to the mantissa comes in mirrored form into the shift array, from which, corresponding to the source record of the inverter, the appropriate line is selected via the decoder, the result of this line is mirrored and thus gives the numeric word in fixed point representation.

BRIEF DESCRIPTION OF THE DRAWINGS

Some preferred embodiments of the invention will now be described by way of example and with reference to the accompanying schematic drawings in which.

DESCRIPTION OF THE PREFERRED EMBODIMENTS

Figure 1:
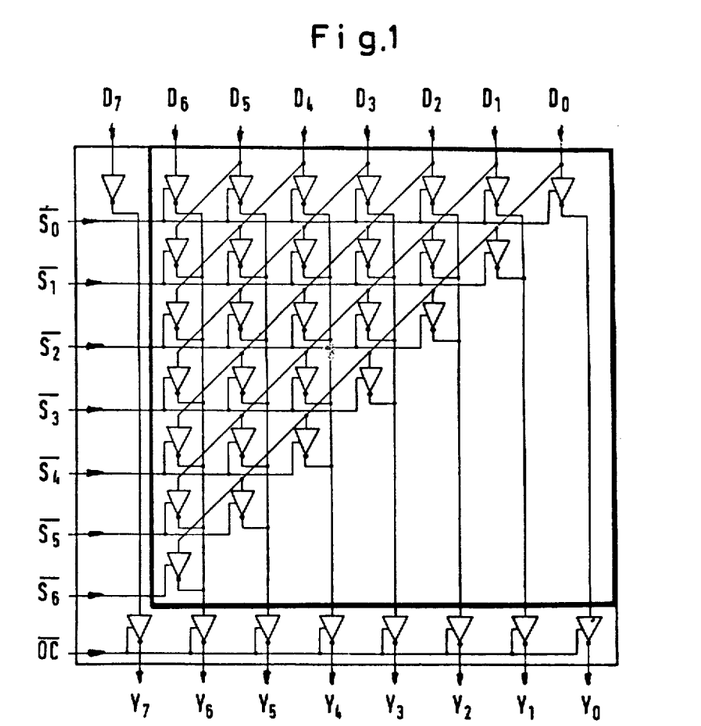
FIG. 1 shows a shift array, constructed with tri-state elements, for an 8-bit data word.

The shift array shown in FIG. 1 is arranged for an 8-bit data word. In this figure, the data inputs D0, D1, . . . , D6 are provided for seven digits of a numeric word, and the position D7 for the sign of this numeric word. Input data from D0 reach one tri-state element in each line and each column of the shift array, the position of D0 being pulled or shifted to the left, line by line from top to bottom, by one position in each case. Correspondingly, input data from D1 reaches the penultimate line of the shift array, and so on, until position D6, for which only a single tri-state element is located in the uppermost line and the left-hand column. The data outputs Y in the output unit, a further line with eight tri-state elements outside the actual shift array, collect together by columns the signal outputs of the tri-state elements of the shift array, a single connection with the tri-state element for D7 at the data input existing for the data output Y7, the sign. The control signal inputs $\overline{S0}$, ..., $\overline{S6}$ for the tri-state elements of the shift array are collected together by lines, so that, with the control signals, that line can be selected from which the input data, shifted to the left by the appropriate number of positions, can be read out. For this purpose, the output line is opened with the control signal $\overline{OC}$.

In the activated state, the tri-state elements allow the signal located at the input, a one or a zero, to pass through to the output, and, in the non-activated state, the tri-state elements show a very high resistance at the output, which effects a decoupling. Circuits of this type with a so-called tri-state output are known as such in many electronic components, but are used in the embodiments of the invention, preferably in the form of inverting tri-state elements, as electronic switches or electronic crosspoints in a switching network.

Figure 2:
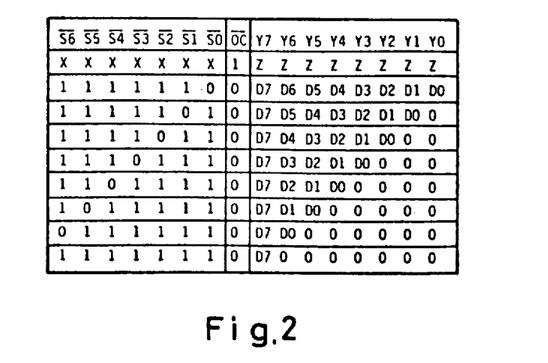
FIG. 2 shows a table for the description of the state of the shift array according to FIG. 1.

The mode of operation of the shift array according to FIG. 1 can be seen from the table given in FIG. 2. If no line of the shift array is activated, that is to say ($\overline{S6}$, ..., $\overline{S0}$) = X, and if the output line is also not opened, that is to say, $\overline{OC}$ = 1, the very high resistances appear at all the data outputs (Y7, ..., Y0) = Z, instead of the signals. The following lines of the table indicate which input data D0, ..., D7 appear at the outputs Y0, ..., Y7 if one of the lines is selected and the output line is opened ($\overline{Si}$=0, $\overline{OC}$=0), or, in the last line of the table, if no line of the shift array is chosen ($\overline{S0}$, ..., $\overline{S6}$)=1.

Figure 3:
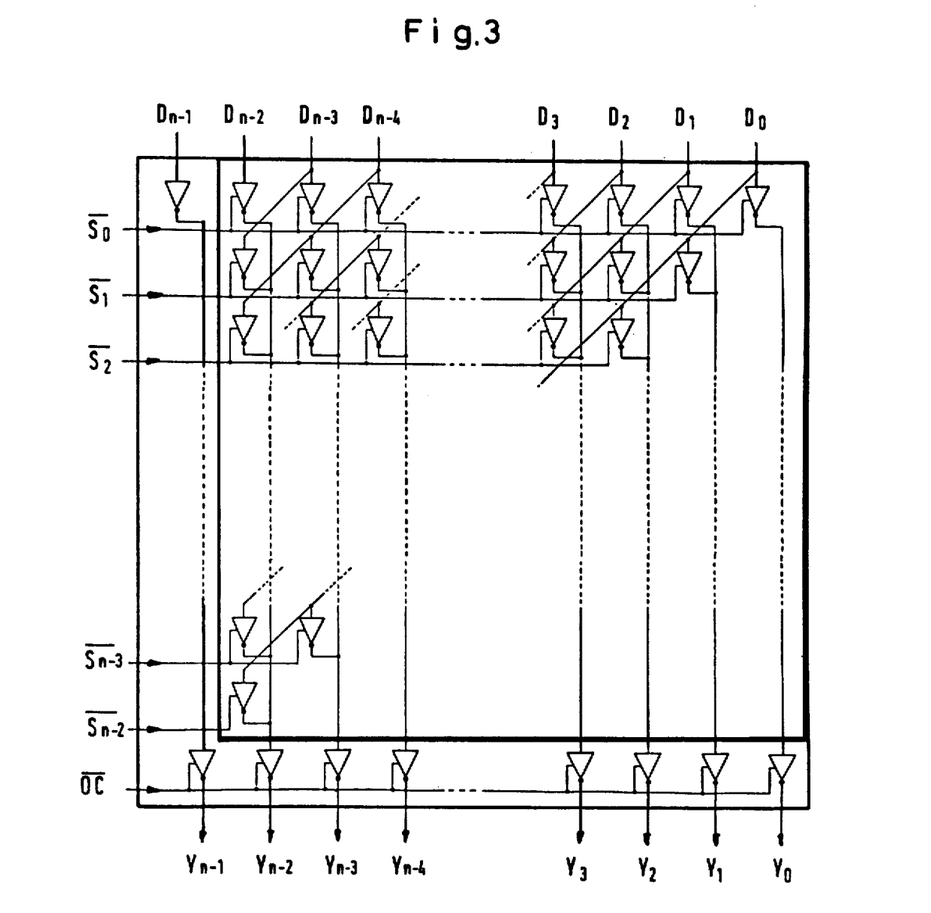
FIG. 3 shows a shift array, corresponding to FIG. 1, constructed with tri-state elements, but for an n-bit data word.

The shift array represented in FIG. 3 differs from that according to FIG. 1 only in size. It can be seen that the principle of construction is the same, and, by a simple extension of the lines and columns of the array, shift operations can be carried out with numeric words having relatively long mantissas. For n-digit numeric words, the shift array contains in n lines and n columns—not including the tri-state elements for signs and for the output unit or output line—a total of n(n+1)/2 elements of this type.

Figure 4:
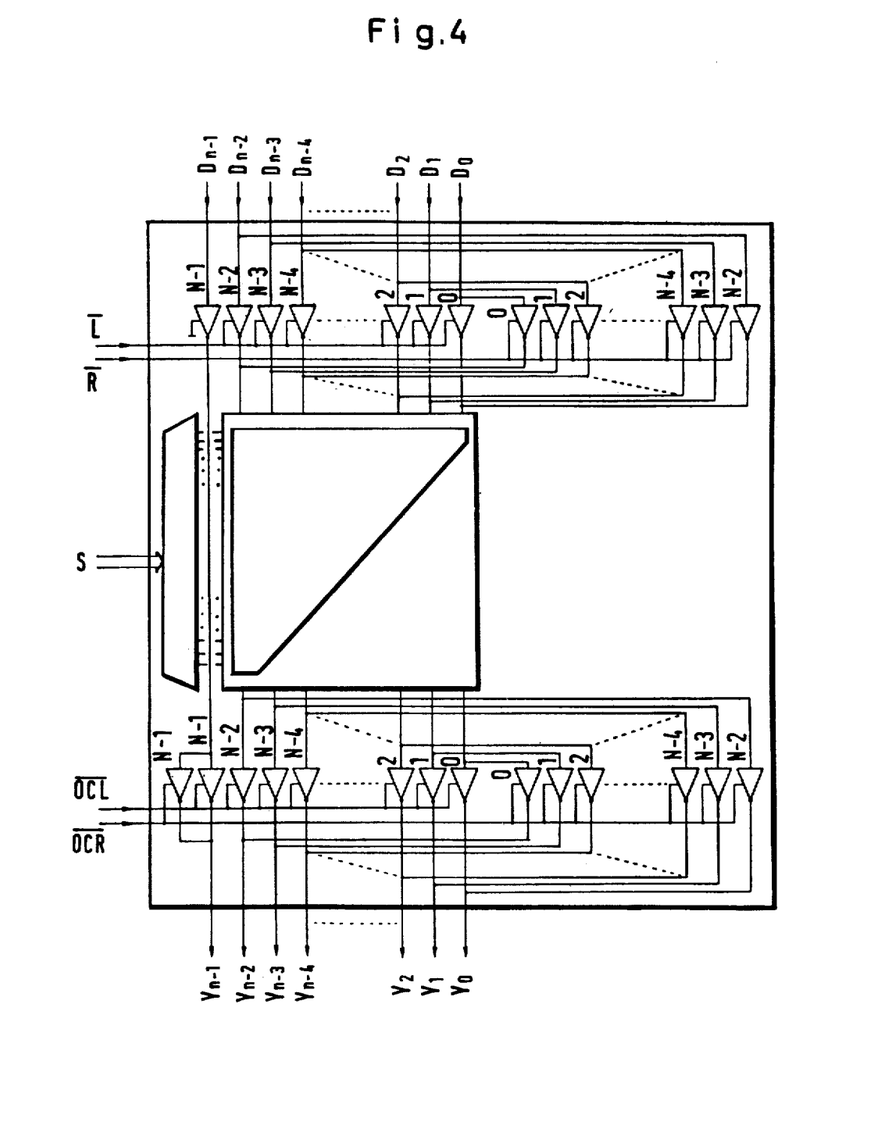
FIG. 4 shows a processing unit consisting of a shift array and of input and output devices which are constructed with tri-state elements.

A processing unit, as shown in FIG. 4, consists of the shift array—now no longer represented in detail here—and of input and output devices, which are constructed from tri-state elements. The special feature of this processing unit consists in being able to carry out left shifts as well as right shifts with the unit, although the shift array is only designed for one direction. The input device consists of two sets of tri-state elements, in which the data inputs of one tri-state element of each of the two sets are connected in parallel. The individual digits of an input numeric word therefore enter the two sets completely identically. The data outputs of one tri-state element of each of the two sets are, however, combined in reverse with respect to the positions:

Position N−2 of the left set with position 0 of the right set,
Position N−3 of the left set with position 1 of the right set,
Position N−4 of the left set with position 2 of the right set,
and so on
until
Position 0 of the left set with position N−2 of the right set.

The position N−1 is meant for the sign of the numeric word, and does not participate in the mirroring. By means of the control signals $\overline{L}$ or $\overline{R}$ for the input device, it can be determined whether the numeric word is to be fed to the shift array in its original position or mirrored. The output unit is identical in its construction with the input unit, except for a trivial difference in the position N−1 for the sign, which is explained immediately below. The shifted numeric word is thereby also available at the data outputs Y0, ..., Y(N−2)-relative to the output of the shift array-in the original position or mirrored. In other words, this has the following meaning: owing to its construction, left-justified positions are rejected in each case from the shift array, and, in place of these, digits are inserted from the right. However, if a shift is required in which right-justified digits are to be omitted, and, correspondingly digits are to be inserted from the left, the particular numeric word is shifted in its mirrored representation and is then again mirrored.

The sign of the numeric word is retained in the operations described. It has therefore to be given at the position Y(N−1) at the data output in exactly the form in which it appears at the data input D(N−1). Since two variants are available for opening the output unit, one tri-state element for the sign signal must also be provided for each of these two variants. These are connected in parallel, with respect to the signal, at the input and at the output, and are directly connected with the data output of the tri-state element of the input unit.

Figure 5:
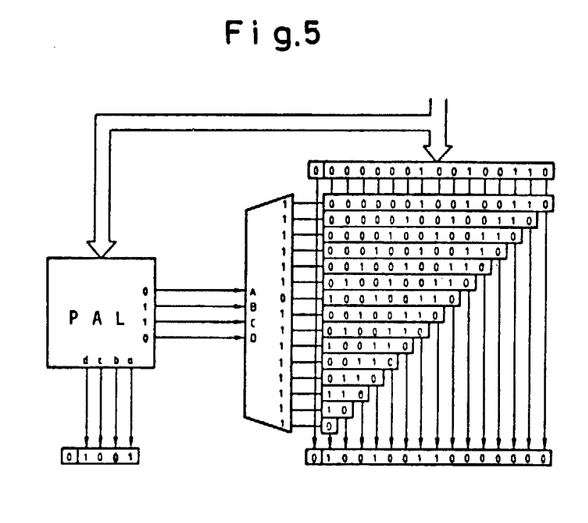
FIG. 5 is a block diagram for a fixed point/floating point converter.

FIG. 5 shows a fixed point/floating point converter in principle, but, at the same time, with an example given in this figure for an operation of this type. A 16-bit data word, the left-justified position of which has a character 0 for the -positive- sign of the decimal number 294 in fixed point representation, reaches this arithmetic unit via the data path. The positions associated with the binary number are: 0000000100100110. (That is: $2^8 + 2^5 + 2^2 + 2^1 = 294 = 2^9(\frac{1}{2} + 1/16 + 1/128 + 1/256)$.)

The binary number enters the shift array, where the positions are shifted progressively from line to line by one digit to the left in each case. The PAL (programmable logic array) module, to which the data word is simultaneously fed, establishes that there are six zeros before the MSB (most significant bit) of the numeric word. It concludes therefrom, on the one hand, that the number to be given in floating point representation must be smaller than $2^9$, since, for a total of 15 positions minus 6 zero position from the left, the following results for the exponent of the number two: $15-6=9$; ($2^9=512$). On the other hand, it gives the number 6 as the source record, in the form 0110, to the decoder, which, taking this source record and using the "1 from 16" generated code, selects that line, in the shift array, in which the first six positions from the left are rejected. This is the ninth line from the bottom. The following thus appear as the result:

---

Mantissa:
sign: 0 (= positive)
numeric word: 100100110000000
Exponent:

-continued sign: 0 (= positive)
numeric word: 1001
As can easily be calculated,
$294 = 2^9 \cdot 0.57421875$,
wherein the mantissa is composed of:
$1 = 0.5$
$1/16 = 0.0625$
$1/128 = 0.0078125$
$1/256 = 0.00390625$
        $0.57421875$ The execution time for this fixed point/floating point conversion is approximately 40 ns, approximately 25 ns being associated with the operation in the PAL module.

Figure 6:
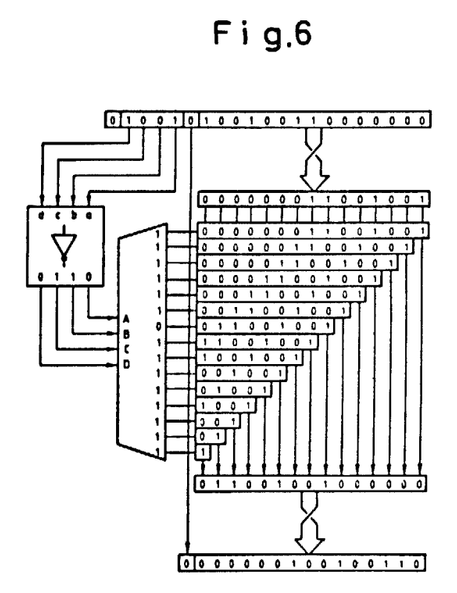
FIG. 6 is a block diagram for a floating point/fixed point converter.

FIG. 6 shows, similarly to FIG. 5, an arithmetic unit, in this case, however, for a floating point/fixed point conversion. The shift array and the decoder are identical with those according to FIG. 5. For the example chosen in FIG. 6, the same numbers are employed as in the example for FIG. 5, for the sake of simplicity. The number present in floating point representation is represented by the 21-bit data word, of which the left-justified digit contains the character for the sign of the exponent, the digits 2 to 5 contain the numeric word for the exponent, the digit 6 contains the character for the sign of the mantissa and the remaining positions contain the numeric word for the mantissa.

The signs of the exponent and of the mantissa remain unchanged in the floating point/fixed point conversion. The numeric word for the mantissa has its MSB position left-justified and cannot therefore be directly fed, for a shift operation, to the shift array, which, owing to its configuration, rejects left-justified positions and inserts digits from the right. The numeric word is therefore fed in mirrored representation to the shift array, this representation being symbolized by the twisted arrow in the input unit. This mirrored numeric word is now retained in readiness in the shift array, in the manner already described, in the individual lines displaced by one—further—position in each case. The choice of the relevant line of the shift array is effected by the decoder, again in the manner already described in connection with FIG. 5.

For this purpose, the formulation of the source record for the decoder from the numeric word of the exponent is required, which formulation is effected in a surprisingly simple manner in the embodiment described here. In order to be able to use the same decoder which is also employed in the other operations, the characters of the exponent numeric word have only to be inverted that is, complemented, and thus form the source record for the decoder.

In the example considered, the ninth line from the bottom in the shift array is thereby selected by the decoder. The binary number abstracted from this line is mirrored, which operation is again symbolized by the twisted arrow in the output unit. The result of this is the fixed point representation of the numeric word.

The execution time for this floating point/fixed point conversion, in this case also in one step, is approximately 30 ns.

The invention may be embodied in other specific forms without departing from the spirit or essential characteristics thereof. The embodiments are therefore to be considered in all respects as illustrative and not restrictive.

A report on the invention described in this text was also given within the framework of the "IEEE 1980 International Conference on Circuits and Computers (ICCC) for Large Scale Systems" from Oct. 1–3, 1980 (Architecture for VLSI Circuits in Digital Signal Processing; authors: Block, R., Bötcher, K., Lacroix, A. and Talmi, M.).

What is claimed is:

1. A multibit unidirectional shifter unit for floating point operation on data from a data input path comprising:
    an input device connected to the data input path to receive data and having two sets each of a plurality n of tri-state elements, each element having a signal input, a control input, and on output, each of said device sets accepting at its respective signal inputs an n-digit data word representation for transmission to the outputs with one of (a) and (b):
        (a) the signal inputs of one input device set being connected in mirror image representation to the signal inputs of the other input device set and the outputs of both input device sets being connected directly to each other,
        (b) the outputs of one input device set being connected in mirror image representation to the outputs of the other input device set and the signal inputs of both sets being connected directly to each other;
    a shift array for an n-digit data work connected to said input device and constructed from tri-state elements, each array element having a signal input, a control input, and an output, said array containing in total a number $n(n+1)/2$ elements arrayed in a triangular array of n rows and n columns:
        a first row of n array elements in columns designated respectively as columns one to n, a second row of n−1 array elements in the columns designated repectively as columns one to n−1, etc., to the nth row of a single array element in the column designated as the first column,
        the n signal inputs of the first row of array elements being connected to receive respectively the n outputs of the elements of one of the sets, and to receive respectively the n outputs of the elements of the other set,
        the signal inputs of each of the elements, except those of the first row, being connected respectively to the respective signal inputs of the elements of the preceding designated row and the preceding designated column,
        all the control inputs of each array element of a like designated row being connected together, and
        all the outputs of each array element of a like designated column being connected together;
    a read and output device comprising two sets each of a plurality n of tri-state elements, each element having a signal input, a control input, and an output, each of said read and output device sets being connected to receive the array tri-state outputs as data representation at its respective read and output signal inputs with one of (a) and (b):
        (a) the signal inputs of one read and output device set being connected in mirror image representation to the signal inputs of the other read and outputs device set and the outputs of both read and output sets being connected directly to each other,
        (b) the outputs of one read and output device set being connected in mirror image representation to the outputs of the other read and output device set and the signal inputs of both read and output sets being connected directly to each other; and a control unit comprising a decoder which decodes a source record into an n-digit object record, the individual characters of the n-digit object record supplying n control signals connected respectively to the control inputs of the tri-state elements of the respective n rows of the array, of which n control signals only one at a time is an activating signal, the others being non-activating;

whereby by means of the one activating control signal the inputs of the shift array are switched through to the read and output device shifted by a number of columns which correspond to the row selected by the activating control signal in one step without intermediate steps.

2. A multibit unidirectional shifter unit as claimed in claim 1, said input device and said read and output device each comprising an additional tri-state element for representation of the sign of a data word.

3. A multibit unidirectional shifter unit as claimed in claim 2 which comprises an integrated circuit containing the tri-state elements of the shift array, of the elements of the input device, and of the read and output device.

4. A multibit unidirectional shifter unit as claimed in claim 2 which comprises an integrated circuit containing said tri-state elements of said shift array, of said input device, of said read and output device, and said integrated circuit further comprising the decoder.

5. A multibit unidirectional shifter unit as claimed in claim 1 which comprises an integrated circuit containing said tri-state elements of said shift array, of said input device, and of said read and output device.

6. A multibit unidirectional shifter unit as claimed in claim 1 which comprises an integrated circuit containing said tri-state elements of said shift array, of said input device, of said read and out device, and also containing the decoder.

7. A multibit unidirectional shifter unit as claimed in claim 1 unit, said control unit including a programmable logic array, one output of said programmable logic array being connected as the source record for the said decoder and another output of said programmable logic array providing an exponent representation.

8. A multibit shifter unit as claimed in claim 7, said programmable array including means to invert a numeric word representation of an exponent representation of the data input to provide an inverted exponent representation.

* * * * *

UNITED STATES PATENT AND TRADEMARK OFFICE
CERTIFICATE OF CORRECTION

PATENT NO. : 4,475,173
DATED : October 2, 1984
INVENTOR(S) : Maati Talmi

It is certified that error appears in the above-identified patent and that said Letters Patent is hereby corrected as shown below:

Col. 10: Line 13, cancel "on" and substitute -- an --.

Col. 10: Line 27, cancel "work" and substitute -- word --.

Col. 10: Line 48, cancel "preceding" and substitute -- succeeding --.

Col. 12: Line 23, cancel "7" and substitute -- 1 --.

Col. 12: Line 24, cancel "programmable array" and substitute -- control unit --.

Signed and Sealed this

Twenty-fifth Day of June 1985

[SEAL]

Attest:

DONALD J. QUIGG

Attesting Officer

Acting Commissioner of Patents and Trademarks